United States Patent
Gupta et al.

(10) Patent No.: US 9,208,250 B2
(45) Date of Patent: Dec. 8, 2015

(54) SYSTEM AND METHOD FOR DYNAMIC MODIFICATION OF WEB PAGE CONTENT TO ENSURE CONSISTENT RESPONSE TIME

(75) Inventors: Puneet Gupta, Bangalore (IN); Akshay Darbari, Allahabad (IN); Venkat Kumar Sivaramamurthy, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 400 days.

(21) Appl. No.: 13/309,967

(22) Filed: Dec. 2, 2011

(65) Prior Publication Data
US 2012/0259974 A1 Oct. 11, 2012

(30) Foreign Application Priority Data
Apr. 7, 2011 (IN) .......................... 1205/CHE/2011

(51) Int. Cl.
*G06F 17/30* (2006.01)
*G06F 7/00* (2006.01)
*H04L 29/08* (2006.01)
*G06Q 10/10* (2012.01)

(52) U.S. Cl.
CPC .......... *G06F 17/30902* (2013.01); *H04L 67/02* (2013.01); *H04L 67/322* (2013.01); *G06F 17/30817* (2013.01); *G06F 17/30867* (2013.01); *G06F 17/30899* (2013.01); *G06Q 10/10* (2013.01)

(58) Field of Classification Search
USPC ......................................................... 707/754
See application file for complete search history.

(56) References Cited

U.S. PATENT DOCUMENTS

| | | | | |
|---|---|---|---|---|
| 6,243,761 B1* | 6/2001 | Mogul | ................... | H04L 29/06 709/217 |
| 7,882,203 B2* | 2/2011 | Sasnett | ................... | G06F 17/24 709/219 |
| 8,515,809 B2* | 8/2013 | Jambunathan | .... | G06F 17/30867 705/14.4 |
| 8,667,165 B2* | 3/2014 | Brabson | .............. | H04L 41/0893 709/223 |
| 9,069,723 B2* | 6/2015 | Samaniego | ...... | H04N 21/47205 |
| 2006/0036764 A1* | 2/2006 | Yokota et al. | ................. | 709/240 |
| 2008/0209017 A1* | 8/2008 | Shuster | ................... | H04L 29/06 709/221 |
| 2008/0215749 A1* | 9/2008 | Bala | ........................ | H04L 12/66 709/233 |
| 2009/0063616 A1* | 3/2009 | Tylutki et al. | ................. | 709/203 |
| 2011/0161488 A1* | 6/2011 | Anderson et al. | ............. | 709/224 |
| 2012/0144281 A1* | 6/2012 | Schechter | ......... | G06F 17/30867 715/205 |
| 2014/0304379 A1* | 10/2014 | Samaniego | ...... | H04N 21/47205 709/221 |

* cited by examiner

*Primary Examiner* — Kuen Lu
(74) *Attorney, Agent, or Firm* — LeClairRyan, a Professional Corporation

(57) ABSTRACT

Dynamic modification of web page content is necessary especially when the delivery time has to be consistent. The present disclosure describes dynamic modification of web page content. The method for dynamic modification of web page comprises computing a required time by a middleware by considering a plurality of system constraints. Further, an available time is computed by the middleware for a data response by using one or both of the plurality of the system constraints and a target time. Determining an amount of the data response to be provided to a client based on the available time and converting the data response based on the amount of data response to be provided to the client.

18 Claims, 4 Drawing Sheets

SYSTEM AND METHOD FOR DYNAMIC MODIFICATION OF WEB PAGE CONTENT TO ENSURE CONSISTENT RESPONSE TIME

This application claims the benefit of Indian Patent Application Filing No. 1205/CHE/2011, filed Apr. 7, 2011, which is hereby incorporated by reference in its entirety.

TECHNICAL FIELD

The present disclosure relates to modification of web page content, and particularly, to a system and a method for dynamic modification of webpage content to ensure consistent response time.

BACKGROUND

Over the past decade the Internet has rapidly become an important source of information for individuals and businesses. The popularity of the internet as an information source is due, in part, to the vast amount of information that can be downloaded by almost anyone having an access to an internet device like a computer with a modem, or a mobile phone on which internet is enabled. Moreover, the internet is especially conducive to browse data or required data on the phone or any web browsing device and has already proven to provide substantial benefits to both businesses and consumers. Due to the success of browsing internet on the mobile phone or any internet device, the speed at which the data loads is very important, especially on hand held devices. But, loading of webpages in a patchy environment such as wireless is not consistent. It has to be noted that loading of webpages depends on network load, wireless environment, content of the web page etc. The existing technology does not take into account the network latency and suitably modifying the content to ensure a quick and consistent response time. So, there is a need in the art to build a solution, which could deliver webpages with a quick and consistent response time considering network latency and other system constraints.

SUMMARY OF THE INVENTION

Aspects of the disclosure relate to dynamic modification of web page content considering a plurality of constraints present in the system. The present disclosure describes methods that would ensure consistent response time or delivery of the web pages considering system constraints such as network latency or content of the web page etc.

According to the one aspect of the present disclosure, a method for dynamic modification of web pages to ensure consistent response time includes computing a required time by the middleware by considering a plurality of system constraints. The target time is the pre-configured time before which the response has to be received by the client. The system constraints can be network latency or size of the web pages or content of the web page etc. The aspect of the present disclosure includes a step of computing the available time by considering at least one or both of the plurality of system constraints and the target time. Another step in the present disclosure includes, determining the amount of data response to be sent to the client based on the available time. The aspect of the present disclosure also includes converting the data response based on the amount of data response that has to be sent to the client within the available time The client generally is unaware of the network conditions or the size of the web page when the request is sent to the server to fetch the required data. Often, due to bad network conditions, system constraints such as network latency affect the usability in terms of lengthy load time. The present disclosure addresses the problem by considering various system constraints and modifies contents appropriately, so that pages are loaded within the consistent response time.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

Figure 1:
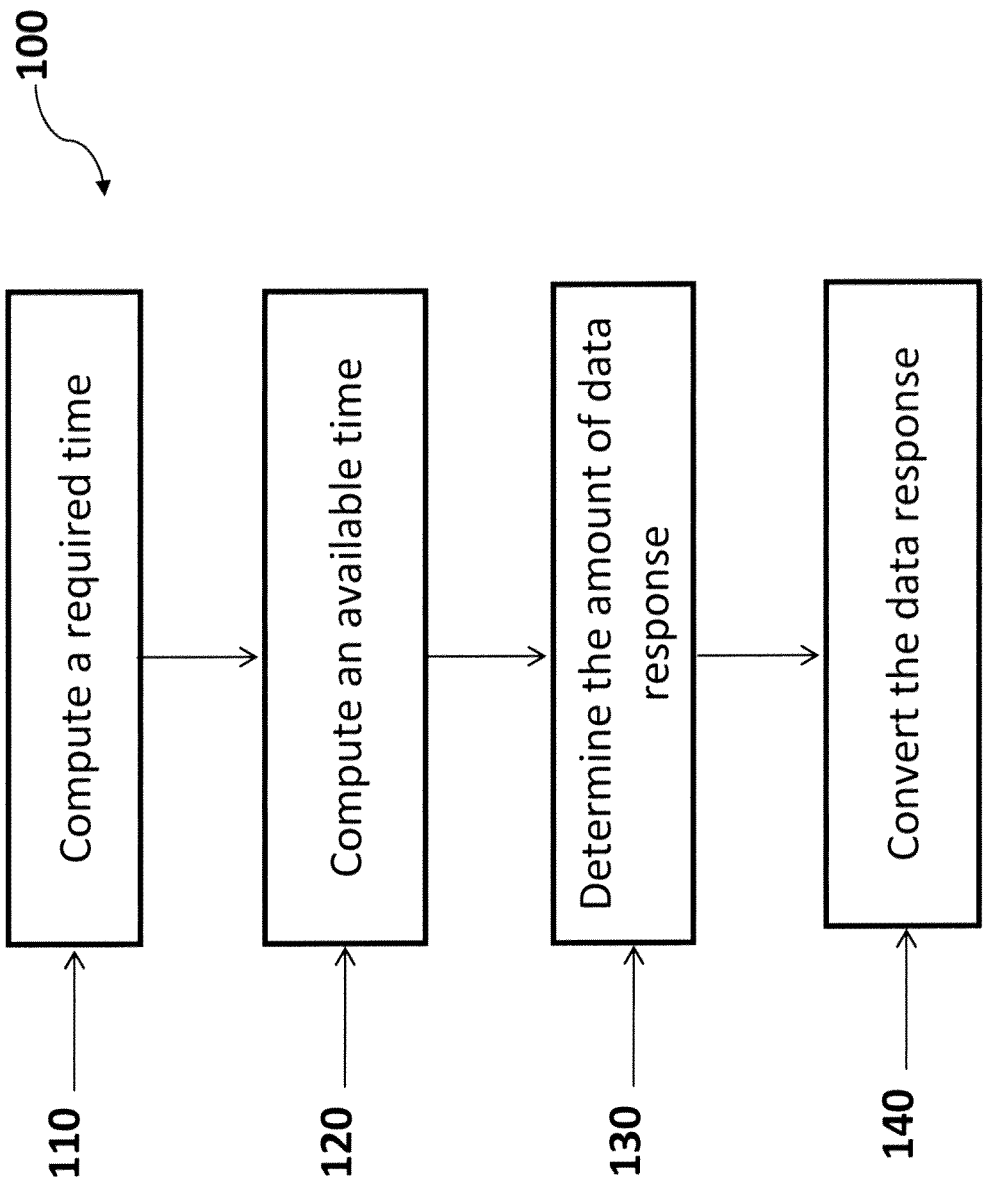
FIG. 1 is a flow chart illustrating a method 100 for dynamic modification of web pages, in accordance with an embodiment of the present invention.

The present disclosure proposes a method for dynamic modification of web pages to ensure consistent response time. FIG. 1 is a flow chart illustrating a method 100 for dynamic modification of web pages to ensure consistent response time, in accordance with an embodiment of the present invention. Method 100 includes a step 110 wherein a required time is computed by the middleware by considering the plurality of system constraints. A data request in the form of requesting for a web page can be sent from the client to the server. The middleware intercepts which can intercept the data request, sends it to the server for processing. The server fetches the data required from its database and sends it back to the middleware. The required time is the amount of time required for the middleware to send the response received from the server to the client. The plurality of system constraints can include but not limited to: a pre-configured data, historical data, real time analysis of network traffic data, hardware performance data, server load data, network latency, a software performance data, and a client constraint data. The middleware can be a module disposed between the client and the server. The middleware is configured to receive the input from the client and send it to the server. Once the middleware receives the required data from the server, it can process it and then send it back to the client.

At step 120, the available time is computed for a data response by the middleware by considering at least one or both of the plurality of system constraints or a target time. The available time is the amount of time before which the data response has to be sent from the middleware to the client. The target time is the pre-configured time before which the data response has to be sent to the client. The available time can be computed by also referring to the target time.

At step 130, the amount of data response to be sent to the client is determined. It is preferable that the amount of data response to be sent to the client is determined by referring to the available time. After referring to the available time, the data response is divided into a plurality of logical individual elements. The logical individual elements can be but not limited to: an image, an audio data, a video data, html constructs and in a vector format such as flash, Silverlight etc. The logical individual elements are identified for conversion.

Each of the logical individual elements is converted separately. For example, the audio transcoding is possible wherein the audio can be converted from MP3 to AAC or AC3; or audio to speech codec; or compression based on fixed or variable bit rate; audio summarization based on the content; or audio to text where the content can be put in a transcript. The middleware can also be configured to with a standard conversion time before which the logical individual elements can be converted or compressed to a different format. The logical individual elements are divided by considering one or more, but not limited to: a direct data analysis; or implicit analysis or explicit analysis. Direct data analysis involves considering the data itself. For example, the round trip delay can be used as a reference. Implicit analysis involves, deriving the importance of each of the elements to figure out the priority. For example, optional field is of least importance provided it can be derived automatically and does not impact the overall action. Explicit analysis in the embodiment of the present disclosure includes time taken by each of the modules in the whole process. For example, parsing of the web content, modification of one or more content, restructuring the page elements etc.

At step 140, the data response is converted based on the amount of data response to be provided to the client. In one of the preferred embodiment of the present disclosure, the data response is converted when the required time is greater than the available time. The logical individual elements are converted to a preferred form based on the amount of data response to be sent. Each of the logical individual elements is converted separately. For example, the audio transcoding is possible wherein the audio can be converted from MP3 to AAC or AC3; or audio to speech codec; or compression based on fixed or variable bit rate; audio summarization based on the content; or audio to text where the content can be put in a transcript. The video transcoding is performed by retaining the video quality. For example, MPEG-2 format can be converted to a H.264; video frames can be converted to still images—MPEG-2 to JPG. Other conversion such as: bit-rate conversion, resizing, frame dropping, from fixed bit-rate to variable bit-rate, video summarization, the video can be dropped to retain audio, converting videos to key frames along with audio or text, dropping the video and converting the audio into text. Images can also be resized, converted from one form to another by retaining the quality, changing the color depth or changing to gray scale or black and white. HTML constructs can be converted by rendering the table in basic format record by record; or excluding optional fields, pagination of forms, and summarization of normal texts. Also vector format such as Flash, Silverlight etc. can be transcoded by downgrading the profile, removing content such as color, depict objects by line, or converting from vectors to bit map.

In another embodiment of the present disclosure, enriching the content of the data response is also possible when the available time is greater than the required time. Enriching the content of the data response involves converting the plurality of logical individual elements to a better format for a better user experience.

Figure 2:
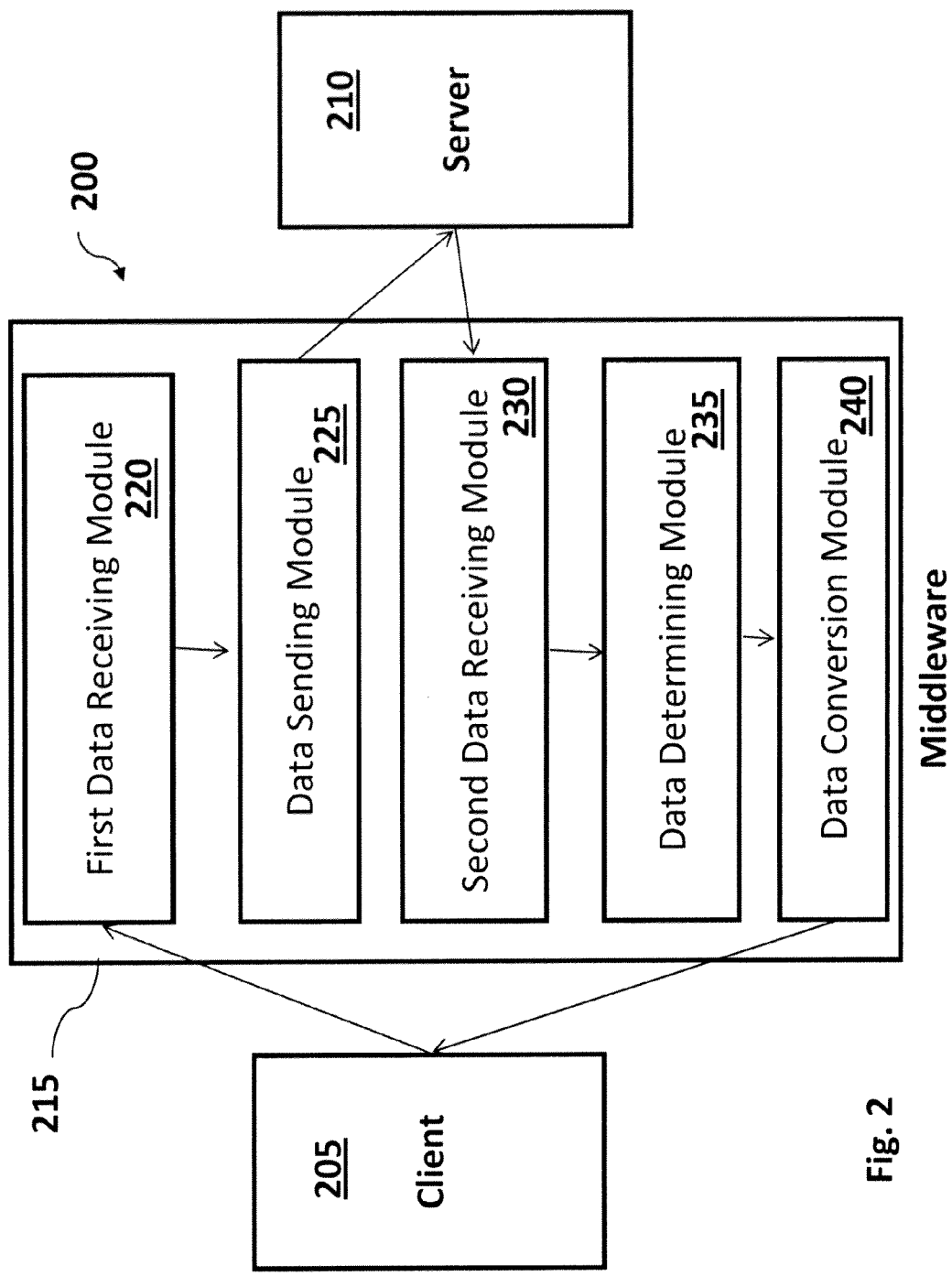
FIG. 2 is a block diagram illustrating a system 200 for dynamic modification of web pages, in accordance with an embodiment of the present invention.

FIG. 2 is a block diagram illustrating a system 200 for dynamic modification of web pages, in accordance with an embodiment of the present invention. System 200 includes a client 205, a server 210 and a middleware 215. The middleware 215 further includes first data receiving module 220, a data sending module 225, second data receiving module 230, a data determining module 235 and a data conversion module 240.

The first data receiving module 220 is configured to receive a request from the client 205. The first input is a data request sent by the client 205. The data request can be a request for a website or a web page or to browse data on the internet. The data request is sent through a communication channel. The communication channel includes but not limited to a wired channel, or a wireless channel or any similar communication channels.

The data sending module 225 is configured to receive input from the first data receiving module 220. In the present embodiment of the disclosure, the data sending module 225 receives the data request and is configured to send the first input to the server 210. In the embodiment of the present disclosure, the data request in the form of a request for a webpage or a website is received by the data sending module 225 and is sent to the server 210 to retrieve the contents of the webpage or the website. After retrieving the data of the webpage or the website, the server 210 sends back the data to the middleware 215.

The server 210 receives the request from the data sending module 225. The data request is a request for a webpage or a website. The server 210 access at least one database to retrieve the contents of the webpage and sends it back to the middleware 215. In another embodiment of the present disclosure, the server 210 can also retrieve the contents of the webpages as a service.

In the embodiment of the present disclosure, the second data receiving module 230 is configured to receive the response from the server 210. The second input is the data response sent by the server to the middleware 215. The data response comprises the contents of the webpage. The second data receiving module 230 can be further configured to store the data response from the server 210 temporarily.

The embodiment of the present disclosure further comprises a data determining module 235. The data determining module 235 can be configured to determine the amount of data response which can be provided to the client 205. The data determining 235 can also be configured to divide the data response into a plurality of logical elements. The data determining 235 is also configured to identify the logical elements for conversion. The middleware 215 can also be configured to with a standard conversion time before which the logical elements can be converted or compressed to a different format. The logical elements are divided by considering one or more, but not limited to: a direct data analysis; or implicit analysis or explicit analysis. Direct data analysis involves considering the data itself For example, the round trip delay can be used as a reference. Implicit analysis involves, deriving the importance of each of the elements to figure out the priority. For example, optional field is of least importance provided it can be derived automatically and does not impact the overall action. Explicit analysis in the embodiment of the present disclosure includes time taken by each of the modules in the whole process. For example, parsing of the web content, modification of one or more content, restructuring the page elements etc.

The data conversion module 240 can be configured to compute at least one or more of an available time or a required time by considering a plurality of system constraints. The available time can be calculated by using a preconfigured response time and an instant of time at which a data response is received from the server 210. The plurality of system constraints can be but not limited to: a pre-configured data, historical data, real time analysis of network traffic data, hardware performance data, server load data, network latency, a software performance data, and a client constraint data. The required time can be computed by using considering one or both of a target time or the plurality of system constraints. The target time is the preconfigured time before which the data response has to be delivered to the client 205. The data conversion module 240 can also be configured to send logical elements which are converted to client 205. The data conversion module 240 can also be configured to convert the logical elements to a preferred form based on the amount of data response to be sent. Each of the logical individual elements is converted separately. For example, the audio transcoding is possible wherein the audio can be converted from MP3 to AAC or AC3; or audio to speech codec; or compression based on fixed or variable bit rate; audio summarization based on the content; or audio to text where the content can be put in a transcript. The video transcoding is performed by retaining the video quality. For example, MPEG-2 format can be converted to a H.264; video frames can be converted to still images—MPEG-2 to JPG. Other conversion such as: bit-rate conversion, resizing, frame dropping, from fixed bit-rate to variable bit-rate, video summarization, the video can be dropped to retain audio, converting videos to key frames along with audio or text, dropping the video and converting the audio into text. Images can also be resized, converted from one form to another by retaining the quality, changing the color depth or changing to gray scale or black and white. HTML constructs can be converted by rendering the table in basic format record by record; or excluding optional fields, pagination of forms, and summarization of normal texts. Also vector format such as Flash, Silverlight etc. can be transcoded by downgrading the profile, removing content such as color, depict objects by line, or converting from vectors to bit map.

In another embodiment of the present disclosure, the data conversion module 240 can be further configured to convert the data response when the required time is greater than the available time.

In another embodiment of the present disclosure, the required time can also be calculated by configuring the first data receiving 220 to periodically receive a plurality of test packets from the client 205.

In another embodiment of the present disclosure, the middleware 215 can also be configured to paginate or segment the data response in to various logical components. The first segment or the first segment along with the other sequential segments is selected to meet the page size which can be sent within the available time. The pages have links or references which can be used to retrieve the other segment or combination of segments. All the segments are retained at the middleware to honor further requests from the user. When the user requests for the subsequent segments the request is processed only by the middleware. The steps mentioned are repeated again and all the remaining segments or part of the segment or next available segment is chosen to be sent to the user to meet the consistent response time. The complete page or part of the webpage is sent back to the client 205 within the preconfigured response time.

Figure 3:
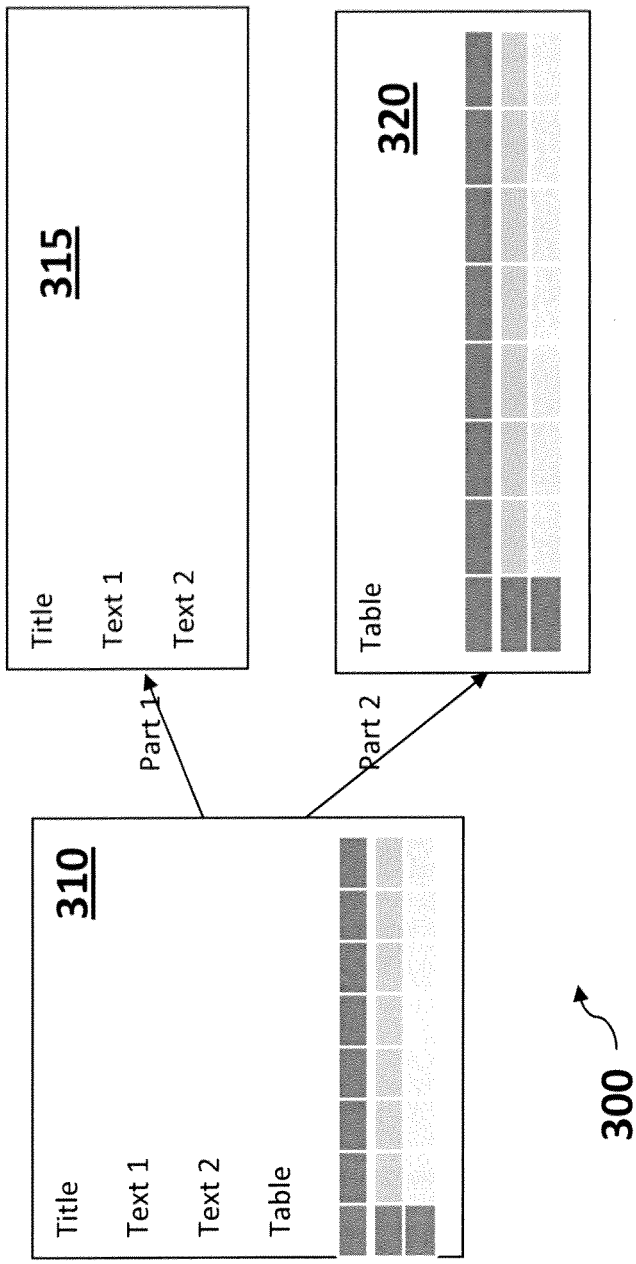
FIG. 3 is an example embodiment of the present disclosure.

FIG. 3 represented by 300 is one of the embodiments of the present disclosure. In accordance to the present disclosure, the webpage 310 can be modified or paginated to 315 and 320 to meet the consistent response time for the client 205 (as shown in FIG. 2). In one of the embodiments of the present disclosure, a link can be provided in the paginated webpage to access the contents of another webpage. For example, if a webpage comprises a table, then after pagination, only the textual data can be sent to the client 205 to keep up with the consistent response time and a link to the table can be provided from which the client can view the table.

In another embodiment of the present disclosure, the contents of the webpage can be dropped based on the priority to meet the consistent response time.

In another embodiment of the present disclosure, the data of the webpage can be dropped by considering the user profile. For example, the audio content can be dropped for a deaf person.

The present disclosure can be better explained considering an example. The client 205 requests content from a server 210. The client device request contains the time stamp and the content length to the message. The client 205 request is intercepted by the middleware 215. The middleware 215 sends the request to the server 210 for processing. The server 210 processes the request. The server 210 sends the response back to the middleware 215. Middleware 215 receives and temporarily stores the response from the server 210 for further processing. Middleware processes the content as follows: Middleware estimates the required time to send the content received from the server 210 based on the computed expected downlink bandwidth and based on the length of the content received from the server. Actual available time to send the content is computed from the preconfigured response time and the time at which the data response is received from the server by the middleware. If the required time is less than that of the available time then the server response is sent as it is without modification. If there is excess of time is available, content can be enriched e.g. ad or any other relevant contextual information. If the required time is more that of available time then the middleware 215 decides to modify the content to meet the preconfigured or available response time as follows: The middleware 215 breaks the page into logical individual elements and identifies the elements for which conversion is possible. Then middleware 215 is configured with the details of the standard conversion time for the elements for which conversions are possible and it uses the current CPU utilization and also based on shortest processing time or least variations to select the elements to be converted and corresponding technique to be used. The conversion is then applied to the element and the page is reformed. The modified page is sent back to the client 205.

Figure 4:
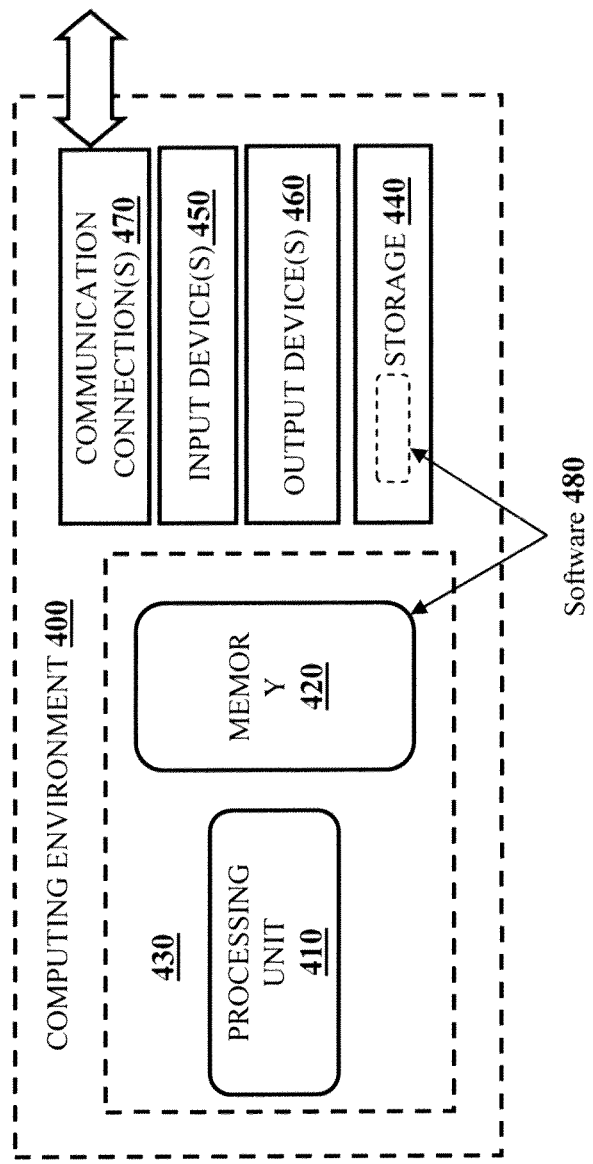
FIG. 4 is a system illustrating a generalized computer network arrangement, in accordance with an embodiment of the present invention.

One or more of the above-described techniques may be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which may be used to store information and which may be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, a television, a hand held device, a head mounted display or a Kiosk that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method for dynamically modifying a webpage comprising:
   determining, by a middleware computing device, a required time to send a received webpage from a server to a client device based on a plurality of system constraints;
   determining, by the middleware computing device, an available time based on one or more of the plurality of the system constraints, or a target time, wherein the determined available time indicates an amount of time remaining to send the received webpage to the client device;
   determining, by the middleware computing device, when the determined available time is greater than the determined required time;
   converting, by the middleware computing device, a format of the received webpage from the server to the client device when the determined available time is greater than the determined required time, wherein the converting the format comprises including contextual information in the received webpage to enrich the received webpage; and
   sending, by the middleware computing device, the received webpage with the converted format to the client device.

2. The method of claim 1 wherein the system constraints comprises one or more of:
   pre-configured data;
   historical data;
   real time analysis of a network traffic data;
   hardware performance data;
   server load data;
   a network latency;
   software performance data; or
   client constraint data.

3. The method as set forth in claim 1 further comprising identifying, by the middleware computing device, portion of data within the received webpage that can be sent to the client device within the determined available time when the determined available time is not greater than the determined required time.

4. The method of claim 3 wherein the identifying further comprises dividing, by the middleware computing device, the identified portion of data within the received webpage into a plurality of logical individual elements.

5. The method of claim 4 wherein the plurality of logical individual elements is divided based on one or more of:
   a direct data analysis;
   an implicit analysis; or
   an explicit analysis.

6. The method as set forth in claim 4 further comprising:
   individually converting, by the middleware computing device, each of the divided plurality of logical individual elements in the received webpage into a compressed format; and
   sending, by the middleware computing device, a modified webpage comprising the identified portion of the webpage with the individually converted plurality of logical individual elements to the compressed format to the client device.

7. A non-transitory computer readable medium having stored thereon instructions for dynamically modifying a webpage comprising machine executable code which when executed by at least one processor, causes the at least one processor to perform steps to and that comprise:
   determine a required time to send a received webpage from a server to a client device based on a plurality of system constraints;
   determine an available time based on one or more of the plurality of the system constraints or a target time, wherein the determined available time indicates an amount of time remaining to send the received webpage to the client device;
   determine when the determined available time is greater than the determined required time;
   convert a format of the received webpage from the server to the client device when the determined available time is greater than the determined required time, wherein the converting the format comprises including contextual information in the received webpage to enrich the received webpage; and
   send the received webpage with the converted format to the client device.

8. The medium as set forth in claim 7 wherein the system constraints comprises one or more of pre-configured data, historical data, real time analysis of a network traffic data, hardware performance data, server load data, a network latency software performance data, or client constraint data.

9. The medium as set forth in claim 7 further comprises identify portion of data within the received webpage that can be sent to the client device within the determined available time when the determined available time is not greater than the determined required time.

10. The medium as set forth in claim 9 wherein the identifying further comprises divide the identified portion of data within the received webpage into a plurality of logical individual elements.

11. The medium as set forth in claim 10 further comprising:
   individually convert each of the divided plurality of logical individual elements in the received webpage into a compressed format; and
   send a modified webpage comprising the identified portion of the webpage with the individually converted plurality of logical individual elements to the compressed format to the client device.

12. The medium as set forth in claim 10 wherein the plurality of logical individual elements is divided based on one or more of a direct data analysis, an implicit analysis, or an explicit analysis.

13. A middleware computing device comprising:
   a processor coupled to a memory and configured to execute programmed instructions stored in the memory to and that comprise:
   determine a required time to send a received webpage from a server to a client device based on a plurality of system constraints;
   determine an available time based on one or more of the plurality of the system constraints or a target time, wherein the determined available time indicates an amount of time remaining to send the received webpage to the client device;
   determine when the determined available time is greater than the determined required time;
   convert a format of the received webpage from the server to the client device when the determined available time is greater than the determined required time, wherein the converting the format comprises including contextual information in the received webpage to enrich the received webpage; and
   send the received webpage with the enriched format to the client device.

14. The device as set forth in claim 13 wherein the system constraints comprises one or more of pre-configured data, historical data, real time analysis of a network traffic data, hardware performance data, server load data, a network latency software performance data, or client constraint data.

15. The device as set forth in claim 13 wherein the processors is further configured to execute programmed instructions stored in the memory further to and that comprise identify portion of data within the received webpage that can be sent to the client device within the determined available time when the determined available time is not greater than the determined required time.

16. The device as set forth in claim 15 wherein the processors is further configured to execute programmed instructions stored in the memory for the identifying further comprises divide the identified portion of data within the received webpage into a plurality of logical individual elements.

17. The device as set forth in claim 16 wherein the processors is further configured to execute programmed instructions stored in the memory to and that comprise:
   individually convert each of the divided plurality of logical individual elements in the received webpage into a compressed format; and
   send a modified webpage comprising the identified portion of the webpage with the individually converted plurality of logical individual elements to the compressed format to the client device.

18. The device as set forth in claim 16 wherein the plurality of logical individual elements is divided based on one or more of a direct data analysis, an implicit analysis, or an explicit analysis.

* * * * *